United States Patent [19]

Wagner

[11] 4,261,638

[45] Apr. 14, 1981

[54] OPTICAL SWITCH WITH ROTATING, REFLECTIVE, CONCAVE SURFACE

[75] Inventor: Richard E. Wagner, Fair Haven, N.J.

[73] Assignee: Bell Laboratories, Murray Hill, N.J.

[21] Appl. No.: 947,650

[22] Filed: Oct. 2, 1978

[51] Int. Cl.³ .................................................. G02B 5/14
[52] U.S. Cl. ................................. 350/96.15; 350/96.20
[58] Field of Search ............... 350/96.15, 96.16, 96.18, 350/96.19, 96.20, 96.21, 96.22, 6.5, 99, 293, 296, 3.70

[56] References Cited

U.S. PATENT DOCUMENTS

| 3,829,195 | 8/1974 | Rawson | 350/96.18 |
|---|---|---|---|
| 3,883,223 | 5/1975 | Hudson | 350/96.16 |
| 4,013,342 | 3/1977 | Narodny | 350/96.20 |
| 4,033,669 | 7/1977 | Hanson | 350/96.15 |
| 4,094,578 | 6/1978 | DiVita et al. | 350/96.15 |
| 4,107,242 | 8/1978 | Runge | 350/96.21 X |
| 4,143,941 | 3/1979 | Soref | 350/96.16 |
| 4,156,556 | 5/1979 | Klein et al. | 350/96.15 |

OTHER PUBLICATIONS

Kompfner et al., SRC Contract B/RC/64915-Progress Report (1975), Part 3: *Holographic Couplers for Optical Fiber Bundles*, Jan. 1977, pp. 79–130.
Reinhart, "Light Switch for Fiber Optics", *IBM Tech. Discl. Bulletin*, vol. 19, No. 12, May 1977, pp. 4681–4682.
Lean, "Taps for Multimode Fibers", *IBM Tech. Discl. Bulletin*, vol. 21, No. 4, Sep. 1978, p. 1685.

*Primary Examiner*—John K. Corbin
*Assistant Examiner*—John D. Lee
*Attorney, Agent, or Firm*—David R. Padnes

[57] ABSTRACT

An optical switch is disclosed which relies only on a rotatable, reflective concave surface (3) to couple light between an optical source (1) and a preselected one of a plurality of optical receptors (6). The switch is bidirectional, i.e., the position of the source(s) and receptor(s) can be interchanged. Optical fibers may be used as the source(s) and receptor(s). The source, however, may also be chosen from such devices as lasers, light-emitting diodes or any other optical source known to those skilled in the art. Similarly, avalanche photodiodes or the like may be used as optical receptors.

The above switch structure requiring only a reflective element is particularly suitable for switching light signals in telecommunication applications. The elimination of the need for a refractive element, such as a lens, provides a structure in which the output signal is independent of wavelength and index of refraction.

27 Claims, 5 Drawing Figures

OPTICAL SWITCH WITH ROTATING, REFLECTIVE, CONCAVE SURFACE

TECHNICAL FIELD

This invention relates to an optical switch and, more particularly, to an optical switch in which the signal on the end face of an optical source is imaged onto one or more of a plurality of optical receptor end faces solely through the use of a concave, reflective surface. The invention is also bidirectional, i.e., the position of the source(s) and receptor(s) can be interchanged.

BACKGROUND OF THE INVENTION

The employment of optical fibers in telecommunications applications requires the ability to switch an optical between optical sources and receptors, such as optical fibers, economically and with a minimum of signal loss. Heretofore, switching between optical sources and receptors has been accomplished using complex optomechanical arrangements.

In U.S. Pat. No. 4,033,669 to Hanson, issued July 5, 1977, switching is achieved by the displacement of one fiber end face relative to a bundle of stationary fiber end faces. This technique is inferior to the present proposal in that a complex assembly of parts is required to meet the precise lateral arrangement between the coupled fiber end faces.

The use of a stationary, concave, spherical reflective surface to couple light from an input fiber to a plurality of output fibers is disclosed in U.S. Pat. No. 3,883,223 to Hudson, issued May 13, 1975. Unlike the present invention, however, there is no ability to switch the optical signal to a preselected fiber.

Most recently, a copending application to Tomlinson-Wagner, filed concurrently and assigned to the same assignee, now U.S. Pat. No. 4,208,094, June 17, 1980, discloses a rotating planar mirror in combination with a one-quarter period rod lens to provide switching. This dependency on a lens, or refractive element, yields a switch in which the output signal varies with changes in the index of refraction and wavelength. Therefore, control of these parameters must be maintained to assure low-loss interconnection.

SUMMARY OF THE INVENTION

An optical switch constructed according to the present invention relies only on a rotatable optical reflective surface to couple light signals between preselected optical source(s) and receptor(s). Such a switch is particularly advantageous in that it can be economically fabricated using a small number of parts and has an output signal which is independent of wavelength and index of refraction.

Pursuant to a preferred embodiment of the invention, a concave spherical mirror is adapted to rotate about an axis. The optical axis of the mirror is displaced from the axis of rotation, with both axes being parallel to one another. A first stationary fiber is centered on the axis of rotation and separated from the mirror by a distance equal to twice the mirror's focal length. In the case of a spherical mirror, twice the focal length is equal to the mirror's radius of curvature. A plurality of stationary second fibers is disposed on a circle concentric with the axis of rotation. The ends of all the fibers face toward the concave side of the mirror and terminate in a plane perpendicular to the axis of rotation. The radius of the concentric circle of second fibers in equal to twice the offset between the mirror's optical axis and the axis of rotation. Accordingly, when light is transmitted through the first fiber and the mirror is rotated, the locus of the output image of the first fiber is a circle concentric with the first fiber, with a radius equal to the distance between the first and second fibers. Then, by a preselected rotation of the mirror, the output image can be made to coincide with a given second fiber end face. It should be understood that any optical source or receptor can be interchanged with any of the above described optical fibers and the same light coupling can be achieved. In addition, bundles of fibers can be used in lieu of any given single fiber, so that the coupling occurs between any combination of single and multifiber bundles. The optical switch is also bidirectional as previously pointed out.

In accordance with a feature of the invention, the ends of the second fibers are longitudinally displaced relative to the first fiber so that the second fiber ends no longer lie in the plane of the first fiber end. Then, by a predetermined longitudinal displacement of the mirror position, according to the well known basic lens formula, the signal from the first fiber can again be imaged onto a given second fiber end face, but with a magnification other than unity.

In accordance with a further feature of the invention, a concave reflective surface that is parabolic, or otherwise aspheric, can be substituted for the concave spherical reflective surface. The location of any such reflective surface is also governed by the basic lens formula to provide, for example, an output image in the plane of the second fiber end faces.

DETAILED DESCRIPTION

Figure 1:
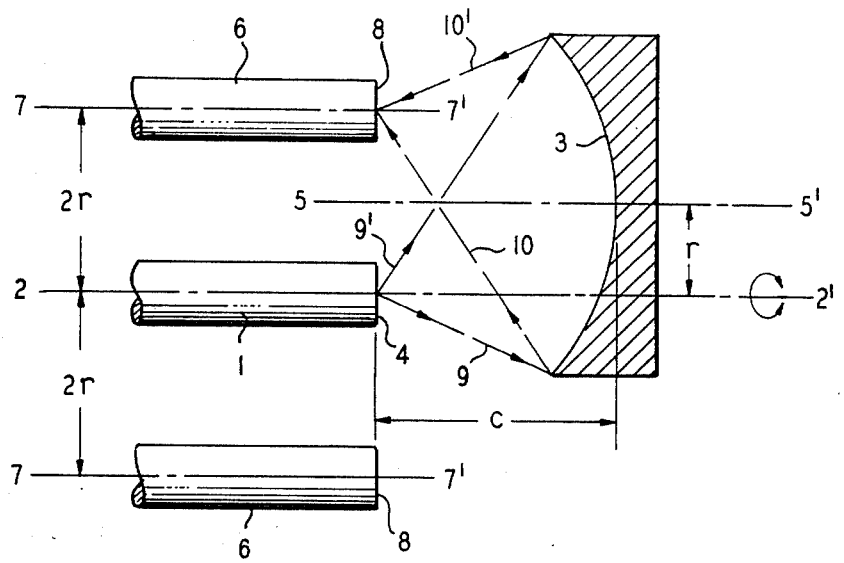
FIG. 1 illustrates a schematic representation of the present invention from which the basic principles of operation may be understood.

As shown in FIG. 1, stationary optical fiber 1 is substantially centered on the axis of rotation 2—2' of concave, reflective surface 3. Surface 3, for convenience shown as spherical is disposed at a distance C from the end face 4 of fiber 1, said distance C being equal to twice the focal length of surface 3. Optical axis 5—5' of surface 3 passes through the center of curvature of said surface, is parallel to the axis of rotation 2—2', and is offset by distance r.

A plurality of stationary second optical fibers 6 is located on a circle about first fiber 1. For illustrative purposes, fibers 6 are shown parallel to first fiber 1. The distance between the axis of rotation 2—2' and second fiber axes 7—7' is substantially equal to twice offset r, or 2r. Accordingly, by rotating surface 3 by a preselected amount, the optical signal emitted from fiber 1 is imaged onto end face 8 of any one of the plurality of second fibers 6. The rays 9 and 9' of the emitted optical signal from a point on end face 4 are reflected by surface 3 to a point on end face 8. The reflected rays are designated as lines 10 and 10'.

It, of course, will be understood that the optical switch described above is bidirectional, i.e., light can be imaged onto end face 4 of fiber 1 from any preselected second fiber 6. Moreover, the optical signal may be coupled from any optical source, such as a light-emitting diode or laser, to any optical receptor, such as an avalanche photodiode, or the like. In the above configurations, a plurality of images, one for each source, will appear. By suitable rotation of surface 3, a preselected image can be aligned with said receptor/first fiber 1.

As shown in FIG. 1, fiber end faces 4 and 8 lie in a single plane perpendicular to rotational axis 2—2'. It should also be readily apparent, however, to those skilled in the art that the preceding limitation is not required. In another embodiment of the invention, the location of any fiber end face can be displaced. Then, by suitable longitudinal displacement of surface 3, according to the well-known lens formula, the light signal can be imaged onto the displaced fiber end faces as described above. With large displacements, the image magnification is not unity allowing for said first and second fibers to be of different diameters. Also, bundles of fibers may be used in lieu of first fiber 1 and/or second fibers 6.

FIGS. 2 through 5 illustrate an embodiment of the present invention using the principles discussed, supra. As shown, the entire switch assembly is comprised of two parts, frustoconical plug 20 and socket 27.

Plug 20 has a cylindrical body portion 21 and frustoconical end 22. A first optical fiber 24 and a plurality of second optical fibers 25 are embedded within plug 20. The end faces of said fibers 24 and 25 are substantially flush or can protrude slightly from end face 23 of frustoconical end 22.

First optical fiber 24 is substantially located on the longitudinal axis 28—28' of plug 20, while second fibers 25 are substantially disposed on a circle about fiber 24. For purposes of illustration, fibers 25, are shown parallel to first fiber 24. The basic shape of member 20 is similar to that disclosed in a pending application of P. K. Runge, for an optical fiber connector, Ser. No. 630,930, filed Nov. 11, 1975, and assigned to the present assignee.

Concave, spherical, reflective surface 26, mounted within socket 27, provides the switching capability. Socket 27 has a frustoconical aperture 30 designed to accept frustoconical end 22 of member 20 and permit rotation of socket 27 about end 22. The axis of rotation of socket 27 is designated as 31—31' and said axis coincides with longitudinal axis 28—28' of plug 20.

As shown, reflective surface 26 is mounted within a depression formed at far end 32 of cylindrical aperture 33. Aperture 33 extends from the narrow end 34 of frustoconical aperture 30 and has a diameter equal to that of narrow end 34.

Optical axis 29—29', passing through the center of curvature of surface 26, is laterally offset and parallel to rotatin axis 31—31'. This offset, designated as R, is one-half the center-to-center spacing 2R between first fiber 24 and second fiber 25.

Figure 5:
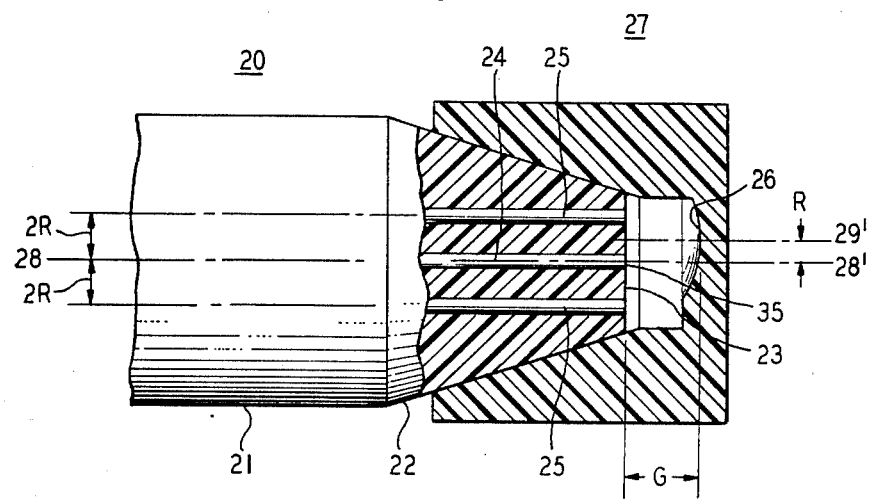
FIG. 5 shows the final assembly of the embodiment illustrated in FIGS. 2 through 4.
Figure 2:
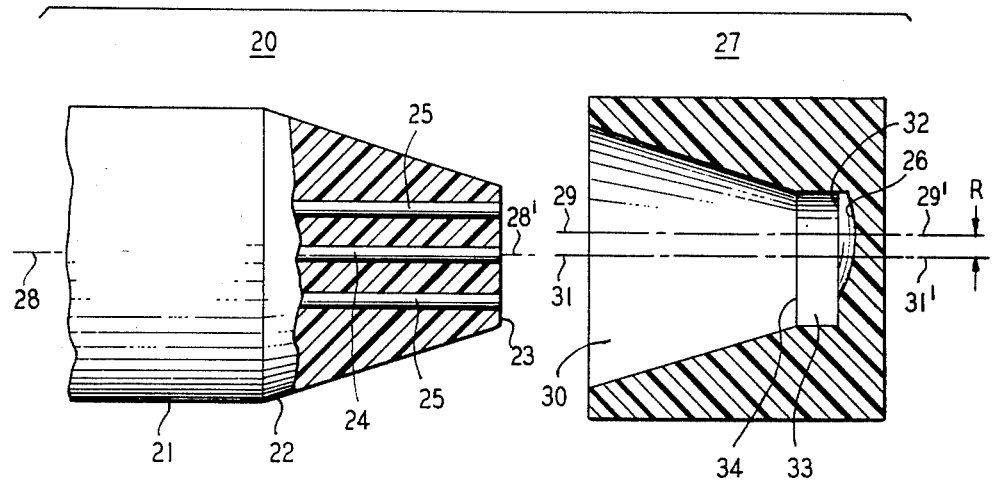
FIG. 2 shows a side view of an embodiment of the invention utilizing a frustoconical plug and mating socket, prior to assembly.
Figure 3:
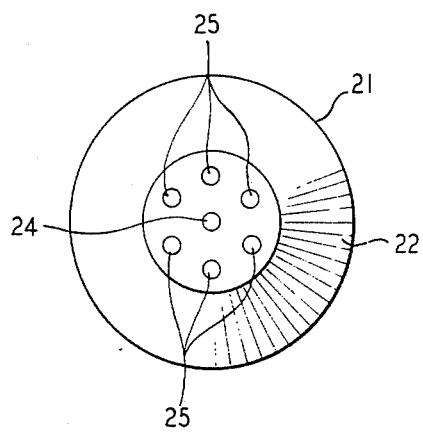
FIGS. 3 and 4 illustrate the end views of said frustoconical plug and socket, respectively.
Figure 4:
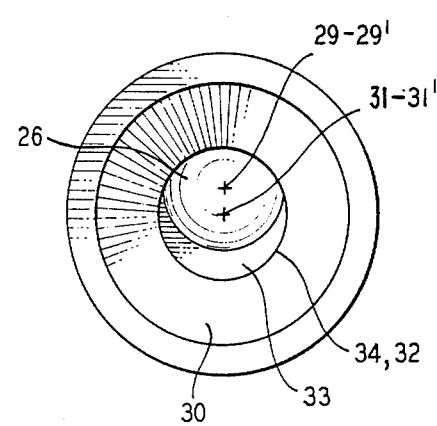

To assemble the switch, frustoconical end 22 of member 20 is fully inserted, as shown in FIG. 5, into frustoconical aperture 30. A gap G exists between the end faces of fibers 24 and 25 and surface 26. Gap G is predetermined so that the distance between end face 35 of fiber 24, and surface 26, is equal to twice the focal length of surface 26. For spherical surfaces, twice the focal length is equal to the radius of curvature of surface 26. Accordingly, as socket 27 rotates, the locus of the image of end surface 35 describes a circle having a radius 2R. By preselecting the degree of rotation, the output image can be aligned with a second fiber end face. To facilitate manual rotation of socket 27, second fibers 25 are advantageously equally spaced from one another. Of course, as with the general description above, this embodiment of the switch is also bidirectional.

Both plug 20 and socket 27 can be economically molded from a plastic material. The trademarked HYFLO MH9-02, a glass-filled epoxy material, is one of several suitable compounds. The concave reflective surface can be embedded within socket 27 or said surface can be formed during molding, and overcoated with a reflective coating by conventional vacuum deposition techniques. Various metals can be used for overcoating, with aluminum being well suited for such deposition.

The socket and plug are also preferably fabricated with detents and engaging protuberances, not shown, to provide mechanical stops thereby controlling the degree of rotation required. If desired, controlled automatic rotation of socket 27 may be provided by suitable electromechanical means.

I claim:

1. An optical switch including an optical source (1) and a plurality of optical receptors (6) CHARACTERIZED IN THAT
    said plurality of optical receptors is located on a circle concentric with said source and surrounding said source; and further including
    a reflective, concave surface (3) rotatably mounted in front of said source and receptors, said reflective surface rotating about an axis (2—2') passing through the center of said source, the optical axis f said reflective surface being radially offset a preselected amount from the axis of rotation so that an optical signal radiating from said source in a direction substantially normal to the plane of said circle is reflected by said concave surface and imaged on said circle in alignment with a given one of said plurality of receptors in accordance with a predetermined rotary positioning of the reflective concave surface, the optical signal radiating from said source capable of being respectively imaged on all of said plurality of receptors in accordance with the degree of rotation imparted to said reflective concave surface.

2. The optical switch of claim 1 wherein said optical source is an optical fiber.

3. The optical switch of claim 1 wherein at least one of said plurality of optical receptors is an optical fiber.

4. An optical switch including an optical receptor (1) and a plurality of optical sources (6) CHARACTERIZED IN THAT
    said plurality of optical sources is located on a circle concentric with said receptor and surrounding said receptor; and further including
    a reflective, concave surface (3) rotatably mounted in front of said sources and receptor, said reflective surface rotating about an axis (2—2') passing through the center of said receptor, the optical axis of said reflective surface being radially offset a preselected amount from the axis of rotation so that an optical signal radiating from a predetermined one of said sources in a direction substantially normal to the plane of said circle is reflected by said concave surface and imaged on the center of said circle in alignment with said receptor in accordance with a predetermined rotary positioning of the reflective concave surface, the optical signal radiating from any of said plurality of sources capable of being respectively imaged on said receptor in accordance with the degree of rotation imparted to said reflective concave surface.

5. The optical switch of claim 4 wherein said optical receptor is an optical fiber.

6. The optical switch of claim 4 wherein at least one of said plurality of optical sources is an optical fiber.

7. The optical switch of claim 2, 3, 5 or 6 wherein the diameters of said optical fibers used as optical sources and receptors are equal.

8. The optical switch of claim 2, 3, 5 or 6 wherein multifiber bundles are selectively disposed in said optical fiber positions.

9. The optical switch of claim 1 or 4 wherein the end faces (4, 8) of said optical sources and receptors lie in a plane substantially perpendicular to said axis of rotation (2—2').

10. An optical switch assembly comprising a plug (20) having a frustoconical end (22) and an optical source (24) disposed within said plug, the center of said source being coincident with the longitudinal axis (28—28') of said plug, the end face of said source being substantially flush with the end face (23) of said frustoconical end, and further CHARACTERIZED BY a plurality of optical receptors (25) also disposed within said plug, said plurality of receptors being located on a circle concentric with said optical source, the ends of said plurality of receptors being substantially aligned with said source end;

a socket (27) having a frustoconical aperture (30) to receive said frustoconical end (22), said socket being capable of rotating about said axis (28—28'); and a concave, reflective surface (26) disposed within said socket with the concave side of said surface oriented toward said source and receptors, said surface being separated from said end face of said source by a distance (G) equal to twice the focal length of said surface, the optical axis (29—29') of said surface also being substantially parallel to said axis (28—28') and offset from said axis (28—28') by a distance (R) equal to one-half the center-to-center distance (2R) between said source and receptors.

11. The optical switch assembly of claim 10 wherein said plug and socket are molded from a plastic material.

12. The optical switch assembly of claim 10 wherein said plug and socket are provided with mating detents and protuberances for controlling the degree of rotation of said socket.

13. The optical switch assembly of claim 10 further including electromechanical coupling means connected to a source of rotation to provide automatic rotation of said socket.

14. The optical switch assembly of claim 10 wherein said reflective surface is spherical.

15. The optical switch assembly of claim 10 wherein said reflective surface is aspheric.

16. The optical switch assembly of claim 10 wherein said reflective surface is parabolic.

17. The optical switch assembly of claim 10 wherein said source is an optical fiber.

18. The optical switch assembly of claim 10 wherein at least one of said plurality of optical receptors is an optical fiber.

19. An optical switch assembly comprising a plug (20) having a frustoconical end (22) and an optical receptor (24) disposed within said plug, the center of said receptor being coincident with the longitudinal axis (28—28') of said plug, the end face of said receptor being substantially flush with the end face (23) of said frustoconical end, and further CHARACTERIZED BY a plurality of optical sources (25) also disposed within said plug, said plurality of sources being located on a circle concentric with said optical receptor, the ends of said plurality of sources being substantially aligned with said receptor end;

a socket (27) having a frustoconical aperture (30) to receive said frustoconical end (22), said socket being capable of rotating about said axis (28—28'); and a concave, reflective surface (26) disposed within said socket with the concave side of said surface oriented toward said sources and receptor, said surface being separated from said end face of said receptor by a distance (G) equal to twice the focal length of said surface, the optical axis (29—29') of said surface also being substantially parallel to said axis (28—28') and offset from said axis (28—28') by a distance (R) equal to one-half the center-to-center distance (2R) between said sources and receptor.

20. The optical switch assembly of claim 19 wherein said plug and socket are molded froma plastic material.

21. The optical switch assembly of claim 19 wherein said plug and socket are provided with mating detents and protuberances for controlling the degree of rotation of said socket.

22. The optical switch assembly of claim 19 further including electromechanical coupling means connected to a source of rotation to provide automatic rotation of said socket.

23. The optical switch assembly of claim 19 wherein said reflective surface is spherical.

24. The optical switch assembly of claim 19 wherein said reflective surface is aspheric.

25. The optical switch assembly of claim 19 wherein said reflective surface is parabolic.

26. The optical switch assembly of claim 19 wherein said optical receptor is an optical fiber.

27. The optical switch assembly of claim 19 wherein at least one of said plurality of optical sources is an optical fiber.

* * * * *